United States Patent Office 2,961,425
Patented Nov. 22, 1960

2,961,425

FLUOROALKYLSILOXANE FLUIDS

Ogden R. Pierce and George W. Holbrook, Midland, Mich., assignors to Dow Corning Corporation, Midland, Mich., a corporation of Michigan No Drawing. Filed Apr. 7, 1958, Ser. No. 726,627

7 Claims. (Cl. 260—46.5)

This invention relates to the preparation of linear copolymers containing fluorinated diorganosiloxane units.

There has been developed a new class of siloxane materials containing radicals of the formula $RCH_2CH_2-$ in which R is a perfluoroalkyl radical. From one to three of these radicals have been attached to a silicon atom with or without other groups in the formation of chlorosilanes. Hydrolysis of the various chlorosilanes has produced siloxane mixtures. In the case of dichlorosilanes, e.g. 3,3,3-trifluoropropylmethyldichlorosilane, cyclic compositions were produced. It was subsequently found that for the formation of higher diorganosiloxane polymers, it was necessary to employ the cyclic trisiloxane. This problem and its solution is discussed in the application of Oscar K. Johannson, Serial No. 594,107, filed June 27, 1956. The cyclic trisiloxanes

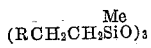

were prepared by Ogden R. Pierce and George W. Holbrook as described in their application Serial No. 594,108, filed June 27, 1956. While the teachings of these applications provided for the production of higher polymers up to and including firm gums, it was found that using standard techniques there was no way of introducing end-blocking units into the siloxane to form a linear polymer. Many standard alkaline and acidic catalysts were tried with no success.

The object of this invention is, therefore, to provide a method of preparing linear diorganosiloxane copolymers in which at least one organic radical on the majority of the disubstituted silicon atoms is a fluoroalkyl radical such as the 3,3,3-trifluoropropyl radical.

This invention then relates to a method for preparing linear siloxane copolymers which comprise reacting (1) a cyclic trisiloxane of the formula

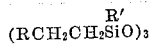

in which each R is a perfluoroalkyl radical of less than 11 carbon atoms, and each R' is selected from the group consisting of the hydrogen atom and aliphatic monovalent hydrocarbon radicals of less than 4 carbon atoms, and (2) a siloxane of the formula $R''(SiR''_2O)_nSiR''_3$, in which each R'' is selected from the group consisting of the hydrogen atom and the methyl, ethyl, vinyl, phenyl and 3,3,3-trifluoropropyl radicals and each $n$ is a positive integer less than 11, in contact with (3) a compound of the formula $XSO_3H$ in which each X is a fluoroalkyl radical selected from the group consisting of perfluoroalkyl radicals of less than 13 carbon atoms and radicals of the formulae $H(CF_2)_m-$ and $F(CF_2)_mCFHCF_2-$ in which each $m$ is a positive integer less than 3.

With regard to the ingredients employed in the method of this invention, the terminology employed is self-explanatory. R can be any perfluoroalkyl radical of from 1 to 10 inclusive carbon atoms such as $CF_3-$, $C_2F_5-$, $C_3F_7-$ up to $C_{10}F_{21}-$. The configuration of these radicals is not critical, i.e. they can be either straight or branch chain. R' can be a hydrogen atom, a methyl radical, an ethyl radical, a propyl radical, an isopropyl radical, a vinyl radical, or an allyl radical. Thus, the cyclic trisiloxane homopolymers (1) can be made up of such units as

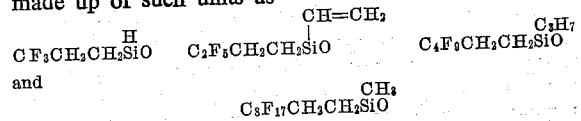

These siloxanes are prepared from the corresponding dichlorosilanes which in turn are prepared by the reaction of an alkene of the formula $RCH=CH_2$ with a dichlorosilane of the formula $R''HSiCl_2$ in the presence of a peroxide or platinum catalyst at temperatures of from 150° to 300° C. An alternative method of preparing the original chlorosilane is that of reacting the olefin

with HBr to give the brominated compounds

and thereafter preparing a Grignard reagent of these materials which can then be reacted with a chlorosilane of the formula $R''SiCl_3$. This method is advantageous when R'' is hydrogen or an unsaturated radical.

The chlorosilanes are hydrolyzed in the conventional manner, and the resulting hydrolyzate mixture of siloxanols and silanols is then heated with an alkali metal hydroxide or an alkali metal salt of a siloxane under conditions which cause the desired trisiloxane to distill from the reaction mixture. This method is more fully described in the aforementioned application of Pierce and Holbrook and can be applied to produce any of the desired trisiloxanes.

The siloxane (2) supplied the end-blocking units for the system employed in this invention. R'' is defined above and $n$ can be any positive integer from 1 to 10 inclusive. When $n$ is 1, siloxane (2) is a disiloxane thereby supplying only end-blocking units to the fluid copolymer produced by the instant method. However, this method is operative where siloxane (2) also contains disubstituted siloxane units. It should be noted, however, that the higher the value of $n$ the greater the number of extraneous diorganosiloxane units will be present in the system and therefore in the final product. This will not only affect the properties of the resulting copolymeric fluid but will decrease the volume efficiency of the reaction system. Thus, a maximum value of 10 for $n$ is not an absolute but a practical limitation. When $n$ is higher than 10, the concentration of end-blocking units in the system is too low to give effective control of the fluids produced and the concentration of $R''_2SiO$ units is so high as to be detrimental to the properties afforded the fluid by the fluoroalkylsiloxane units introduced in the siloxane (1). While siloxane (2) is preferably hexamethyldisiloxane, it can be made up of any of such units as

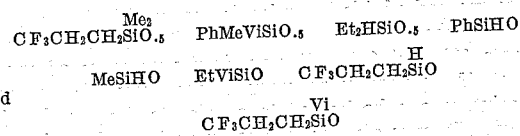

where Me, Et, Ph and Vi represent the methyl, ethyl, phenyl and vinyl radicals respectively.

Compound (3) is a sulfonic acid catalyst in which the organic radical is a fluorinated saturated aliphatic hydrocarbon. These fluorinated radicals can be perfluoroalkyl radicals of from 1 to 12 inclusive carbon atoms or alkyl radicals of from 1 to 4 carbon atoms in which all but one of the hydrogens are replaced by fluorine atoms. From the known methods of preparation, the remaining hydrogen atom in the latter type of radical can only be on the carbon atoms which are alpha or beta to the sulfur. Thus, the following sulfonic acids are typical of those which are operative in this invention: $CF_3SO_3H$, $C_2F_5SO_3H$, $C_4H_9SO_3H$, $C_8F_{17}SO_3H$, $HCF_2CF_2SO_3H$, $CF_2HSO_3H$ and $CF_3CFHCF_2SO_3H$.

The preparation of the perfluoroalkane sulfonic acids is discussed generally in the following two publications: "Perfluoroalkyl Derivatives of Sulphur. Part IV. Perfluoroalkanesulphonic Acids" by T. Gramstad and R. N. Hazeldine, Journal of the Chemical Society (London), 1956, pages 173 to 180; "Perfluoroalkyl Derivatives of Sulphur. Part VI. Perfluoroalkanesulphonic Acids $CF_3 \cdot [CF_2]_n \cdot SO_3H$ ($n=1-7$)" by Gramstad and Haszeldine, Journal of the Chemical Society (London), 1957, pages 2640 to 2645. The method described therein involves the electrochemical fluorination of compounds of the formula $CH_3(CH_2)_aSO_2Cl$ where $a$ ranges in value from 0 to 7. For the preparation of a particular acid a 5 percent solution of the corresponding commercially available non-fluorinated sulfonyl chloride in hydrogen fluoride is electrolized at 5.0 volts until the current flow falls to the vicinity of 2 amperes. Depending on the size of the alkyl group, this fluorination can take from 15 to 40 hours. The resulting perfluoroalkane sulfonyl fluoride is then isolated by distillation and hydrolyzed by agitating a 20 percent by weight excess in 10 percent aqueous sodium or potassium hydroxide in a sealed tube at room temperature for 15 hours. The resulting sulfonate is filtered out and distilled from 100 percent sulfuric acid.

A variation of the above method produces $CF_2HSO_3$. This variation merely involves the incomplete electrochemical fluorination of $CH_3SO_2Cl$. It has ben found that at least two fluorines must be on the carbon attached to the sulfur atom for the resulting sulfonic acid to be operative in this invention. Consequently, monofluoromethanesulfonic acid is much less efficient.

The other sulfonic acids which are operative in the instant invention are those containing 2, 3 or 4 carbon atoms which are perfluorinated except for one hydrogen atom on the carbon beta to the sulfur atom. These materials are prepared by reacting sodium bisulfite in water with the appropriate perfluoroalkene under pressure whereby the bisulfite adds across the double bond.

The specific conditions for the preparation of $HCF_2CF_2SO_3H$ are disclosed in "Addition Reactions of Tetrafluoroethylene" by D. D. Coffman, M. S. Raasch, G. W. Rigby, P. R. Barrick and W. E. Hanford in Journal of Organic Chemistry, 1949, 14, pages 747 to 753. In this particular instance the sodium sulfite solution and tetrafluoroethylene is reacted under pressure in the vicinity of 300 p.s.i at 120° C. preferably in the presence of some free radical generator such as benzoyl peroxide. A solid product is recovered by filtration of solids and evaporation of the filtrate to dryness. This product is acidified with 35 percent sulfuric acid, filtered and distilled to produce the acid monohydrate which is reacted with thionyl chloride to produce the above acid. However, this method can be used with hexafluoropropene or octafluorobutene in place of tetrafluoroethylene.

The method of this invention is accomplished by merely mixing the three components described above. Components (1) and (2) will react in the presence of component (3) generally at room temperature. However, the mixture can be heated to accelerate the reaction if desired. It may also be necessary to heat the mixture to a fluid long enough for the reaction to commence, after which the product acts as a solvent. The amount of component (3) which is necessary for this method to be operative can be as low as the equivalent of 1 sulfur atom per 10,000 silicon atoms. There is no critical upper limit to the amount of acid employed. However, since it is a catalyst operative in what is generally known as a catalytic amount, there is no reason to employ the acid in ratios above 1 mol of acid per 10 mols of siloxane. The viscosity of the fluid is controlled essentially by the ratio of component (2) to component (1) in the reaction system. When the reaction is complete, the acid catalyst can be removed by such standard techniques as distillation or washing or it may be left in the fluid.

The fluids of this composition have been found to have excellent dielectric properties and, therefore, are useful as dielectric fluids in such electrical equipment as capacitors and transformers. These fluids can, of course, contain such additives as coloring pigments, rust inhibitors and the like and can be thickened with fillers where desired.

The following examples are illustrative and are not intended to limit this invention which is properly delineated in the claims. Vi stands for the vinyl radical.

*Example 1*

27.9 grams of

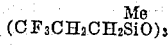

and 8 grams of $Me_2ViSiO(SiMe_2O)_4SiMe_2Vi$ were mixed with 3 drops (approximately 1.2 grams) of $CF_3SO_3H$ to give a S/Si ratio of approximately .02. This mixture was stirred for three hours at room temperature. The system pressure was then reduced to 0.1 mm. Hg and stirring was continued for one hour after which the reaction mixture was stripped to 200° C. under the same vacuum. 3 grams of volatiles were recovered which boiled above the range of either the trifluoropropylmethylsiloxane cyclic trimer or cyclic tetramer. 31 grams of product having a viscosity of 280 cs. at 25° C. were analyzed and found to contain vinyl groups. The trifluoromethanesulfonic acid was distilled off prior to the volatiles.

*Example 2*

1544.4 grams of $[CF_3CH_2CH_2Si(CH_3)O]_3$ and 8.1 grams of hexamethyldisiloxane were mixed with trifluoromethanesulfonic acid in such proportions as to give the sulfur to silicon ratios shown in the table below. In each case the mixtures were stirred at room temperature for approximately three hours and were stripped at 200° C. at 0.1 mm. Hg. In each case the viscosity of the resulting fluid was measured. The trifluoromethanesulfonic acid, which was recovered in the strip prior to the volatiles, is not included in the data below.

TABLE I

| S/Si | Viscosity (cs. at 25° C.) | Volatiles (percent by wt. of total siloxanes in reaction mixture) |
| --- | --- | --- |
| .00067 | 11,080 | 0 |
| .00067 | 11,500 | 0 |
| .0013 | 11,980 | 0 |
| .0013 | 11,300 | 0 |
| .0040 | 11,480 | 0 |
| .0040 | 11,510 | 0 |
| .0067 | 14,760 | 3-6 |
| .0067 | 13,770 | 3-6 |

There were no apparent silicon-bonded hydroxyl groups in these fluids.

*Example 3*

3,3,3-trifluoropropylmethylcyclotrisiloxane and hexamethyldisiloxane were mixed in a ratio of 199 mols of trifluoropropylmethylsiloxy units per mol of trimethylsiloxy units. This mixture was divided into two batches. Trifluoromethanesulfonic acid was added to each batch in amount to give a ratio of sulfur to silicon of .004. Each was stirred at room temperature for approximately three hours, at which time the pressure system was reduced to 0.1 mm. Hg and the two batches were heated to 200° C. The sulfonic acid was recovered in both cases but no other volatiles were found. The resulting fluids had viscosities of 28,450 cs. and 33,250 cs. at 25°

C. Neither of the fluid products contained any apparent silicon-bonded hydroxyl groups.

The above experiment was repeated with a siloxane mol ratio of 24 3,3,3-trifluoropropylmethylsiloxy units per trimethylsiloxy unit. Again the sulfonic acid was recovered in both cases. One fluid product had a viscosity of 1949 cs. at 25° C. There was a trace of volatiles recovered from this system. The other fluid product had a viscosity of 1797 cs. at 25° C. and this system yielded no volatiles. Again there were no apparent silicon-bonded hydroxyl groups present in the fluids.

Example 4

A mixture of 95 mol percent 3,3,3-trifluoropropylmethylsiloxy units present as the cyclic trisiloxane, 5 mol percent trimethylsiloxy units present as hexamethyldisiloxane and trifluoromethanesulfonic acid in amount to give a sulfur to silicon ratio of .004 was agitated at room temperature until it reached equilibrium. This reaction mixture was split into two portions. The first was stripped to 250° C. at 0.1 mm. of Hg yielding the acid catalyst and no volatiles. The pot residue was a fluid having a viscosity of 1400 cs. at 25° C. The second portion was dissolved in diethylether, washed with water, aqueous sodium bicarbonate solution and water, dried by filtering through a diatomaceous earth and concentrated by distilling off the solvent at atmospheric pressure. This material was then stripped to 250° C. at 0.1 mm. Hg, yielding the acid catalyst and no volatiles. The fluid in the pot had a viscosity of 1375 cs. at 25° C.

Example 5

A mixture of 99 mol percent 3,3,3-trifluoropropylmethylsiloxy units present as the cyclic trisiloxane, 1 mol percent trimethylsiloxy units present as hexamethyldisiloxane and pentafluoroethanesulfonic acid present in amount to give a S/Si ratio of approximately .004 reached equilibrium after being stirred at room temperature for two hours. The reaction mixture was stripped to 220° C. at 0.4 mm. Hg, yielding no volatiles. A fluid having a viscosity of 14,320 cs. at 25° C. was left in the pot. This fluid showed a trace of silicon-bonded hydroxyls (0.12%).

Example 6

3,3,3-trifluoropropylmethylsiloxy units present as the cyclic trimer and trimethylsiloxy units present as hexamethyldisiloxane were mixed in a mol ratio of 100:1 with 4 drops of HCF$_2$CF$_2$SO$_3$H giving a S/Si ratio of approximately .0435. This mixture was stirred for 23 hours, flooded with water, dissolved in methylisobutylketone, washed neutral with water, dried and devolatilized at 200° C. and 2 mm. Hg. The acid catalyst was recovered, but no volatile siloxanes were obtained. The residue, a fluid having a viscosity of 10,000 cs. at 25° C. was analyzed and found to be free of silicon-bonded hydroxyl groups.

Example 7

When the following siloxanes are substituted for the 3,3,3-trifluoropropylmethylcyclotrisiloxane in the preparation of Example 1, the corresponding vinyldimethylsiloxy-endblocked fluids are produced:

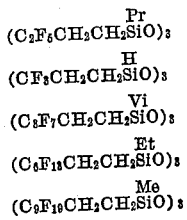

Example 8

When the following siloxanes are substituted in equimolar amounts for the hexamethyldisiloxane in the preparation described in Example 2, the resulting fluids are endblocked with the corresponding trisubstituted siloxane units:

CF$_3$CH$_2$CH$_2$EtPhSiOSiEtPhCH$_2$CH$_2$CF$_3$
HMe$_2$SiOSiPh$_2$H
Me$_3$SiO(SiHMeO)$_2$SiMe$_3$
Vi$_2$PhSiOSiPhVi$_2$
PhMe$_2$SiOSiMePh$_2$

Example 9

When HCF$_2$SO$_3$H and C$_8$F$_{17}$SO$_3$H are each substituted for the trifluoromethanesulfonic acid employed in Example 2 in such amounts as to give the same S/Si ratios, the resulting fluids are essentially the same.

That which is claimed is:

1. A method for preparing linear siloxane copolymers which comprises reacting (1) a cyclic trisiloxane of the formula

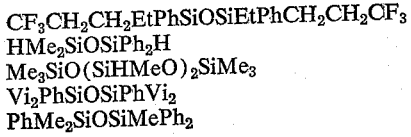

in which each R is a perfluoroalkyl radical of less than 11 carbon atoms and each R′ is selected from the group consisting of the hydrogen atom and aliphatic monovalent hydrocarbon radicals of less than 4 carbon atoms, and (2) a siloxane of the formula R″(SiR″$_2$O)$_n$SiR″$_3$, in which each R″ is selected from the group consisting of the hydrogen atom and the methyl, ethyl, vinyl, phenyl and 3,3,3-trifluoropropyl radicals and each $n$ is a positive integer less than 11, in contact with (3) a compound of the formula XSO$_3$H in which each X is selected from the group consisting of perfluoroalkyl radicals of less than 13 carbon atoms and radicals of the formulae H(CF$_2$)$_m$— and F(CF$_2$)$_m$CFHCF$_2$— in which each $m$ is a positive integer less than 3.

2. The method of claim 1 wherein X is CF$_3$—.

3. The method which comprises reacting (1)

[CF$_3$CH$_2$CH$_2$Si(CH$_3$)O]$_3$ and (2) (CH$_3$)$_3$SiOSi(CH$_3$)$_3$ in contact with (3) CF$_3$SO$_3$H.

4. A linear siloxane copolymer fluid consisting essentially of units of the formula

and endblocking units of the formula R″$_3$SiO$_{.5}$, in which each R is a perfluoroalkyl radical of less than 11 carbon atoms, each R′ is selected from the group consisting of the hydrogen atom and aliphatic monovalent hydrocarbon radicals of less than 4 carbon atoms and each R″ is selected from the group consisting of the hydrogen atom, aliphatic monovalent hydrocarbon radicals of no more than two carbon atoms, the phenyl and 3,3,3-trifluoropropyl radicals.

5. A linear siloxane copolymer fluid consisting essentially of units of the formula RCH$_2$CH$_2$Si(CH$_3$)O and endblocking units of the formula R″(CH$_3$)$_2$SiO$_{.5}$, in which each R is a perfluoroalkyl radical of less than 11 carbon atoms and each R″ is an aliphatic monovalent hydrocarbon radical of no more than two carbon atoms.

6. A linear siloxane copolymer fluid consisting essentially of units of the formula RCH$_2$CH$_2$Si(CH$_3$)O, in which each R is a perfluoroalkyl radical of less than 11 carbon atoms, and endblocking units of the formula (CH$_3$)$_3$SiO$_{.5}$.

7. A linear siloxane copolymer fluid consisting essentially of CF$_3$CH$_2$CH$_2$Si(CH$_3$)O units and endblocking units of the formula (CH$_3$)$_3$SiO$_{.5}$.

References Cited in the file of this patent

UNITED STATES PATENTS

| | | |
|---|---|---|
| 2,715,113 | Gordon | Aug. 9, 1955 |
| 2,800,494 | Haluska | July 23, 1957 |
| 2,809,207 | Gainer | Oct. 8, 1957 |
| 2,838,423 | Gilkey | June 10, 1958 |

UNITED STATES PATENT OFFICE
CERTIFICATE OF CORRECTION

Patent No. 2,961,425

November 22, 1960

Ogden R. Pierce et al.

It is hereby certified that error appears in the above numbered patent requiring correction and that the said Letters Patent should read as corrected below.

Column 3, line 4, for "$C_4H_9SO_3H$" read -- $C_4F_9SO_3H$ --.

Signed and sealed this 8th day of January 1963.

(SEAL)
Attest:

ERNEST W. SWIDER
Attesting Officer

DAVID L. LADD
Commissioner of Patents